Patented Dec. 26, 1922.

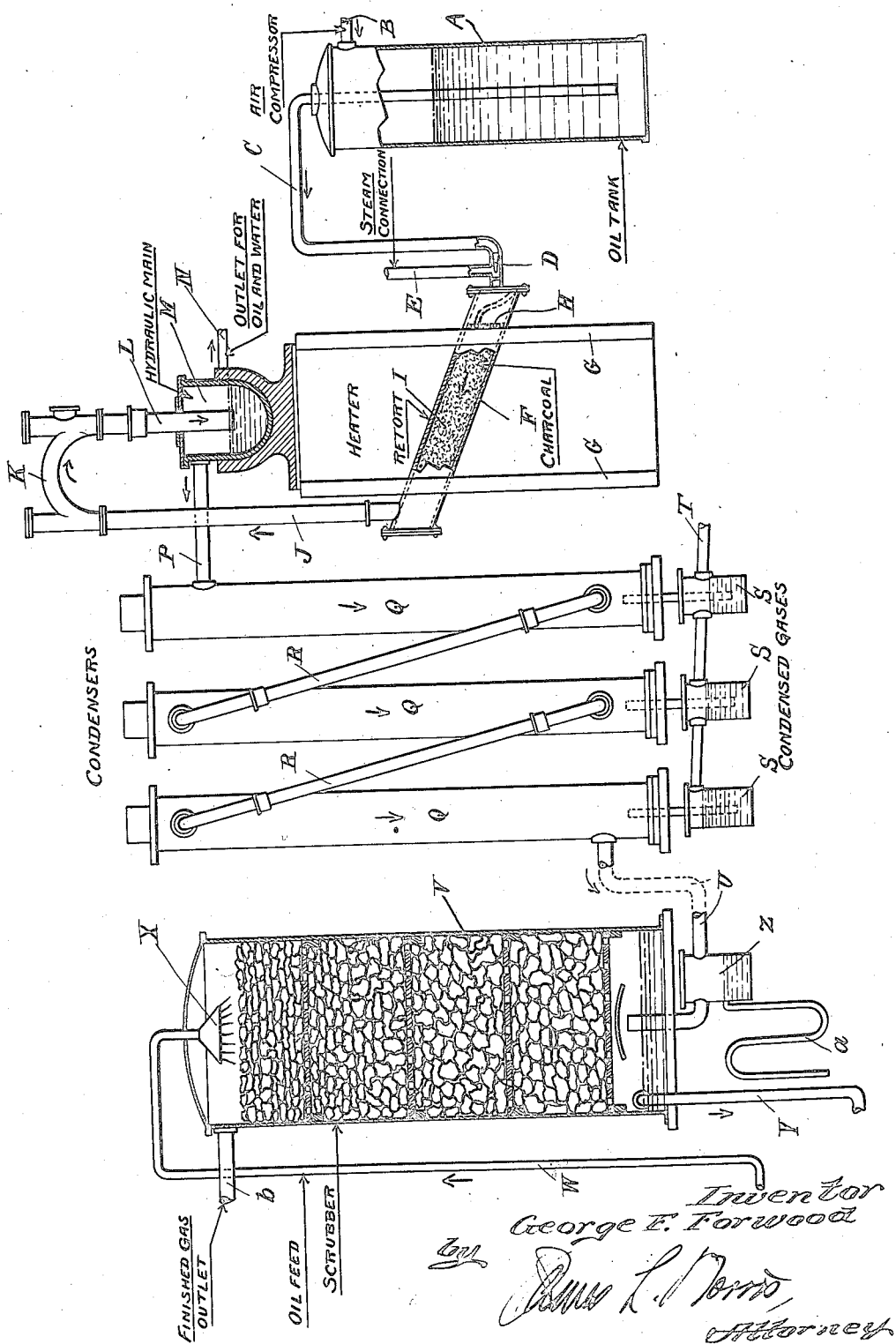

1,440,286

UNITED STATES PATENT OFFICE.

GEORGE FREDERICK FORWOOD, OF LONDON, ENGLAND, ASSIGNOR, BY DIRECT AND MESNE ASSIGNMENTS, TO THE UNITED KINGDOM OIL COMPANY LIMITED, OF LONDON, ENGLAND.

TREATMENT OF HYDROCARBONS.

Application filed December 20, 1917. Serial No. 208,139.

*To all whom it may concern:*

Be it known that I, GEORGE FREDERICK FORWOOD, a subject of the King of Great Britain, residing at London, England, have invented certain new and useful Improvements in the Treatment of Hydrocarbons (for which I have filed applications in England December 12, 1916, and December 22, 1916), of which the following is a specification.

My invention consists in passing the vapour of coal oil; shale oil; petroleum, or lignite oil mixed with steam or water vapor over hot carbon or a kind capable of decomposing steam or water vapor when both are at a heat below a temperature of 600° C., so that the carbon liberates hydrogen from the steam; and this hydrogen is taken up by the oil hydrogenating it, the object being to obtain an oil or spirit, such as petrol, suitable as a motor fuel and for other uses.

Proposals of this sort have been made before, but to secure success it is necessary (1) that the temperature is not too high, as that destroys the oil, (2) that the carbon shall be in such a condition that it will decompose the steam or water vapor at a low enough temperature not to injure the oil, and (3) that there must be enough steam or water vapor to insure that sufficient is decomposed at the working temperature.

In order that the carbon shall be suitable it must be in a physical condition in which it will decompose steam or water vapor at the temperature used. Thus, if an oil is being treated which requires a temperature of about 500° C., to combine with the hydrogen produced by the decomposition of the steam or water vapor passing over the heated carbon, the carbon must be able to decompose the steam or water vapor at about 500° C. Graphite, retort carbon, and coke are thus not available. The carbon must be prepared without being heated to a high temperature. Thus, if oil residue, or carbonized oil is to be used it must not be heated much above the working temperature, in fact, it is advisable to carbonize it as nearly as possible at the working temperature, but it may be heated beyond this within reasonable limits, though there is no object in so heating it.

Lampblack, soot, wood, cellulose, and lignite charcoal may stand a higher temperature without losing the power of decomposing water at the temperature of working, but again it is best not to carbonize them at temperatures much higher than those at which they are to be used. Different organic bodies may have their carbonaceous residues heated to different temperature without destroying their action on steam or water vapor at temperatures below 600° C. The kinds of carbon necessary for use according to the present invention may be obtained from any carbonizable body by carbonization thereof at a temperature below 600° C., and primarily a carbon will be selected that is active at a comparatively low temperature for treating oil vapor by deoxidizing steam or water vapor in its presence at temperatures that will not destroy the oil.

Steam or water vapor is used in excess, because the decomposition at low temperatures goes best in excess.

The temperature of operation on the oil vapor varies with the oil, generally it is between 500 and 600° C.

If the oil vapors are heated too much, carbon is deposited, which is detrimental. The most perfect result is the mere addition of hydrogen to the oil vapor, without reducing its carbon. This involves consumption of the solid carbon supplied. The next best result is to add hydrogen, and to oxidize some of the carbon in the oil vapor at the same time. If carbon is deposited it means that most of it, if not all, the oxide of carbon formed is also at the expense of the carbon in the oil vapor.

The best temperature and the proportion of water vapour have to be found by trial for each oil. I have found various temperatures between 500° C. and 600° C. suitable for different oils.

It is not always necessary to "crack" the different oils. In many cases it is advantageous merely to add hydrogen by this process. An important result of my process is that if the oil contains sulphur, most, and in some cases, all of it is eliminated as sulphuretted hydrogen.

Examples of the treatment of specific oils according to this invention are given as follows:—

In carrying out the process for treating oil, say kerosene, in which a cracking of the oil takes place, I take kerosene (boiling point 170° C.–220° C.) and subject same, in a vessel, to a pressure of 20 lbs. per square inch. The oil is then forced through an injector into a retort in which the carbon is heated where it is met by and mixed with steam or water vapor also under pressure, perfect atomization of the oil taking place at this point.

The atomized oil and steam or water vapor pass together through the retort which is filled with the selected carbon of comparatively low carbonizing temperature and the vapors leaving the retort are condensed and treated in the ordinary manner. In conducting experiments, I took 140 cubic centimetres of kerosene (boiling point 170° C. to 200° C.) and the carbon employed was prepared from willow wood carbonized at a low temperature, i. e. at about 400° C.) the retort being heated to a temperature of about 570° C. The proportion of steam used was equivalent to 4.7 volumes of water to one volume of oil. The time occupied in passing the 140 cc. of atomized oil through the retort filled with heated carbon was sixty five minutes.

After passing through the retort the vapours were led through a water cooled condenser and the condensed portion was collected in a suitable receiver. The uncondensed vapours then passed upwards through a scrubber filled with scrubbing material such as coke or broken brick, while heavy oil such as creosote oil passed through the scrubber in the opposite direction to the vapours. Before the creosote oil was used for scrubbing purposes all the fractions below 240° C. were first removed. In the receiver and scrubber about 48 per cent of the original volume of the kerosene was collected as a light oil of a boiling point between 49° and 170° C. About 40 per cent of the original volume of the kerosene remained unaltered and was available for further treatment, the balance of 12 per cent was converted into gas suitable for heating the retort or for steam raising. A sample of gas collected at the outlet of the scrubber gave the following results on analysis:—

Carbon dioxide, oxygen and carbon monoxide together=28% by volume.
Hydrocarbons (methane etc.)=7%.
Hydrogen=60%.
Nitrogen=5% by volume.

This gas is a mixture of the gas produced from the oil and that produced by the decomposition of the steam used.

(b) For hydrogenation of light oils or spirits which already have been cracked, the treatment is similar to that to which heavier oils are subjected except that the heat of the retort is about 500° C.

Note.—Where heat is employed in the production of hydrogen through the decomposition of steam by carbon, it is extremely difficult to hydrogenate the unsaturated bodies without some slight loss of oil due to cracking.

In carrying out the experiments with a light oil I took 100 cubic centimetres of a light cracked spirit (boiling point 53°–150° C.) and the proportion of steam used was equivalent to 1½ volumes of water to one volume of oil.

The time occupied in passing the 100 c. c. of spirit through the retort filled with heated carbon was 70 minutes. After passing through the retort the vapours were dealt with in a similar manner to that described under (a).

In the receiver and scrubber about 95 per cent of the original volume of the cracked spirit was collected. The remaining five per cent was converted into gas suitable for heating the retort or for steam raising. A sample of gas collected at the outlet of the scrubber gave the following results, on analysis:—

Carbon dioxide, oxygen and carbon monoxide together=25% by volume.
Hydrocarbons (methane etc.)=4½%.
Hydrogen=64%.
Nitrogen=6½% by volume.

This gas is a mixture of the gas produced from the spirit and that produced by the decomposition of the steam used.

The hydrogenated spirit was compared with the spirit before hydrogenation by means of agitation with a saturated aqueous solution of bromine; the bromine is absorbed and decolourized by the unsaturated bodies present in the spirit and the brominating was taken as complete when the last single drop of bromine solution remained a pale yellow colour after addition to and agitation with the spirit.

It was found that the spirit before hydrogenation required three times as much bromine as the spirit after hydrogenation required, therefore the hydrogenated spirit contained 66⅔ per cent less of the unsaturated bodies than was contained in the original spirit.

(c) For the removal of sulphur compounds only.

Note.—Where heat is employed in the production of hydrogen through the decomposition of steam by carbon, it is not practicable to hydrogenate the sulphur without at the same time hydrogenating the unsaturated bodies. 233 cubic centimetres of light spirit distilled from a shale oil were passed with steam through a retort filled with carbon heated to a temperature of about 530° C. The proportion of steam used was equivalent to 2¾ volumes of water to one volume of spirit. The time occupied in passing the 233 c. c. of spirit through the retort filled with heated carbon was 60 minutes.

In passing through the heated carbon the sulphur contained in the spirit was hydrogenated by the hydrogen produced by the decomposition of the steam, sulphuretted hydrogen being thereby formed, which escaped together with the other gases (carbon dioxide, hydrogen etc.) at the outlet of the retort.

The condensed spirit together with that scrubbed out of the gases by the scrubber oil (heavy creosote) were collected and washed with a dilute solution of caustic soda in order to remove any sulphuretted hydrogen, this was followed by a washing with water to remove all traces of soda.

The sulphur content in the finished spirit was found to be equal to 1.8 per cent by weight, whereas that in the original spirit was found to be equal to 4.9 per cent by weight, hence there is a reduction of sulphur in the hydrogenated spirit equal to 3.1 per cent by weight or equivalent to a reduction of 63¼ per cent of the original weight of the sulphur.

The foregoing process is not in the least limited to any particular apparatus, but for the purpose of demonstration the drawing illustrates a sectional elevation of an apparatus suitable for carrying out the improved process or method.

Referring to this drawing: A is a tank for containing the oil to be treated and has a pipe B connected thereto and leading from a suitable air compressor, not shown, and whereby air compression is passed to the tank to act upon the surface of the oil in the latter. A pipe C extends downwardly into and near the bottom of the tank A and leads away from the top of the tank and connects with an injector nozzle D, adjacent to the attachment to the nozzle of a steam pipe E leading from a suitable source of steam supply for mixing steam with the oil after it passes from the said injector D. Between the walls G of a furnace or heater a retort F is supported to an angle and has its lower end connected to a continuation of the pipe C on the opposite side of the injector or nozzle D and in advance of the connection of the steam pipe E. Within the retort F is a perforated iron stop plate H adapted to support charcoal I in the retort at the lower end of the latter. From the upper end of the retort a pipe J extends and is connected by a branch pipe K and a dip pipe L to a hydraulic main M for passing the products of combustion from the retort into said main and causing the products to pass through the liquid in the main, the main having an outlet N for oil and water. The gases and vapors, after passing through the seal in the hydraulic main M, are conveyed by a pipe P into a plurality of condensers Q and may be collected either by water or atmospherically, the gases passing from one condenser to another through the medium of pipes R as usual and are condensed, and the oil from the condensed gases and vapors is deposited in the receivers S from which it is taken by a pipe T to an oil tank, the uncondensed vapors passing by way of pipe U to a scrubber V. This scrubber V is filled with broken brick, coke or boards laid crosswise and heavy oil is supplied to the scrubber from a suitable pump by the pipe W and is sprayed over the broken coke or brick by the sprayer X, and after passing through the broken brick or coke, flows to a storage tank by way of the outlet pipe Y. Any oil from the uncondensed gases and vapors passed to the scrubber V from the pipe U is collected in the receiver Z and passes to a tank by way of the seal pipe a, the finished gas passing away form the scrubber V by the pipe b. It will be understood that the retort F may be inclined in any manner to render it effective in the performance of its function and any type of condensers may be used, and in some cases the scrubber may be dispensed with and a rotary washer used in place thereof.

What I do claim as my invention, and desire to secure by Letters Patent, is:—

1. The herein described process of treating unsaturated hydrocarbon oils to hydrogenate the same, consisting in subjecting the oil to pressure to atomize it and instantly mixing the atomized oil with steam, passing the mixed atomized oil and steam through a mass composed solely of a light porous form of charcoal heated at a temperature below 600° C to decompose the steam below this temperature, and conveying the gases and vapors formed to a plurality of condensers to separate the vapors and oil from the condensed gases and vapors.

2. The herein described process of treating hydrocarbon oils to hydrogenate the same, which consists in subjecting the oil to pressure to atomize it and instantly mixing the atomized oil with steam, passing the mixed atomized oil and steam through a mass of light porous charcoal heated at a temperature below 600° C to decompose the water vapors below this temperature, separating the vapors and oil from the condensed gases and vapors, and finally supplying sprayed heavy oil to the uncondensed gases and remaining vapors.

3. The herein described process of hydrogenating oils, consisting in subjecting the oil to pressure to atomize it and instantly mixing the atomized oil with steam, passing the mixed atomized oil and steam solely through a mass of charcoal heated to a temperature below 600° C. to decompose the steam and with the resultant hydrogen in its nascent or atomic condition at the moment of its liberation from the steam effecting a combination with the unsaturated bodies in the cracked oil and converting them into saturated bodies.

In testimony whereof I have hereunto set my hand in presence of two subscribing witnesses.

GEORGE FREDERICK FORWOOD.

Witnesses:
 PERCY G. MATTOCKS,
 WILL O. BROWN.